(12) United States Patent
Koch

(10) Patent No.: US 7,406,796 B1
(45) Date of Patent: Aug. 5, 2008

(54) DIVER AND PLANER FISHING DEVICE

(76) Inventor: Alexander W. Koch, P.O. Box 847, Winchester, OR (US) 97495

( * ) Notice: Subject to any disclaimer, the term of this patent is extended or adjusted under 35 U.S.C. 154(b) by 434 days.

(21) Appl. No.: 11/062,071

(22) Filed: Feb. 18, 2005

(51) Int. Cl.
*A01K 91/08* (2006.01)

(52) U.S. Cl. .................. 43/43.13; 43/43.12

(58) Field of Classification Search .......... 43/43.12, 43/43.13, 44.87, 44.88, 44.9, 44.91, 44.92
See application file for complete search history.

(56) References Cited

U.S. PATENT DOCUMENTS

| | | | | |
|---|---|---|---|---|
| 2,799,115 A | * | 7/1957 | Reus | 43/43.12 |
| 3,808,727 A | * | 5/1974 | Flanders | 43/43.13 |
| 3,898,759 A | * | 8/1975 | Jensen | 43/43.13 |
| 4,069,611 A | * | 1/1978 | Dusich et al. | 43/43.12 |
| 4,129,956 A | * | 12/1978 | Neary | 43/43.13 |
| 4,212,127 A | * | 7/1980 | Daniels | 43/43.12 |
| 4,809,457 A | * | 3/1989 | Macachor | 43/43.12 |
| 5,018,296 A | * | 5/1991 | Putz, II | 43/43.12 |
| 5,197,223 A | * | 3/1993 | Spurgeon | 43/43.12 |
| 5,276,994 A | * | 1/1994 | Thompson et al. | 43/43.13 |
| 6,658,784 B1 | * | 12/2003 | Mastropaolo | 43/43.13 |

* cited by examiner

*Primary Examiner*—David J Parsley
(74) *Attorney, Agent, or Firm*—Robert E. Howard

(57) ABSTRACT

A fishing device that can act in one mode as either a diver or side diver, and in a second mode as a side sub-surface planer. The device includes a top plate, a curved bottom plate joined at their leading and trailing edges. Side plates are attached to the right and left sides of the top and bottom plates to thereby form a watertight compartment. A keel member is mounted on the curved bottom plate in a manner adapted to allow the keel member to be adjusted and held at any position between substantial abutment with the bottom edge of the right side plate and substantial abutment with the bottom edge of the left side plate. A keel weight is attached to the keel member. To cause the device to act in its second mode, a planer mode arm is removably attached to one of the side plates.

14 Claims, 4 Drawing Sheets

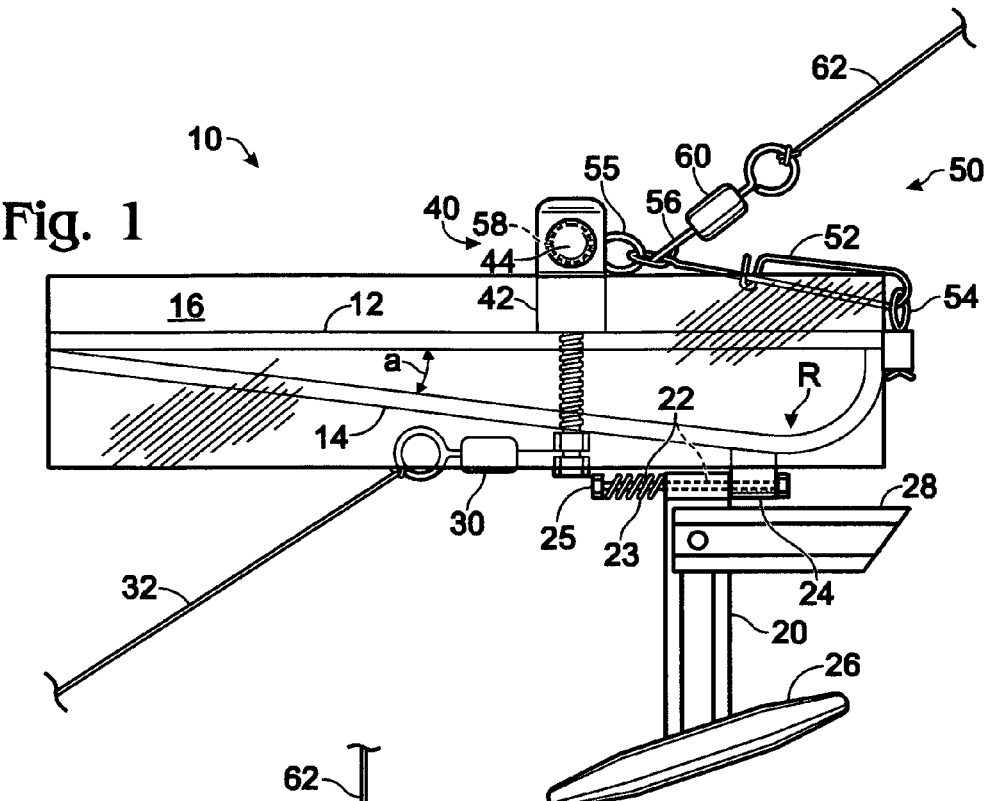
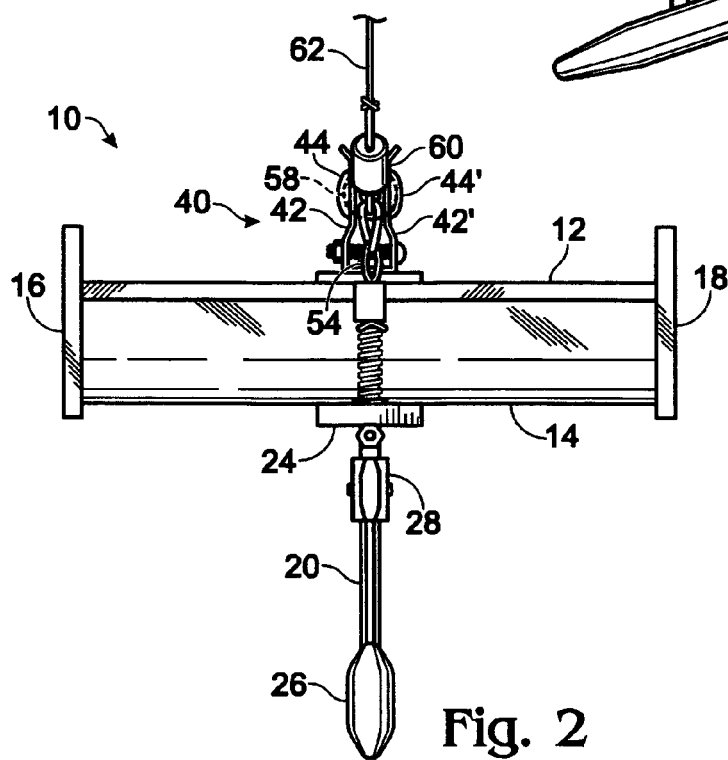

DIVER AND PLANER FISHING DEVICE

BACKGROUND OF THE INVENTION

The present invention relates to a fishing device that can act in one mode as either a diver or side diver, and in a second mode as a side sub-surface planer.

There are many fishing devices that act as either divers or planers. It is not believed that the prior art has suggested a fishing device that can act as both a diver and planer. It is not believed that any prior art fishing device can act in a side diver mode.

SUMMARY OF THE INVENTION

It is an object of the present invention to provide a fishing device that can be used as a deep diver, side diver and a side sub-surface planer, all of which would float when at rest (not moving).

The fishing device of the present invention can act in one mode as either a diver or side diver, and in a second mode as a side sub-surface planer.

For operation in its first mode, the device includes a top plate, a curved bottom plate joined at their leading and trailing edges. Side plates are attached to the right and left sides of the top and bottom plates to thereby form a watertight compartment. A keel member is mounted on the curved bottom plate in a manner adapted to allow the keel member to be adjusted and held at any position between substantial abutment with the bottom edge of the right side plate and substantial abutment with the bottom edge of the left side plate. A keel weight is attached to the keel member.

To cause the device to act in its second mode, a planer mode arm is removably attached to one of the side plates.

BRIEF DESCRIPTION OF THE DRAWINGS

FIG. 1 is a right side elevational view of the fishing device of the present invention;

FIG. 2 is a front elevational view thereof;

DESCRIPTION OF PREFERRED EMBODIMENTS

Figure 3A:
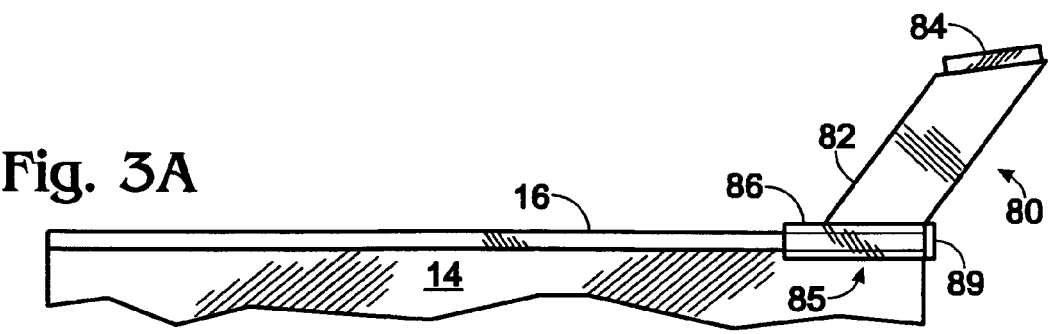
FIG. 3A is a side elevational view of a planer ski attachment that can be attached to the fishing device of the present invention.

The basic fishing device 10 of the present invention includes a flat top plate 12, a curved bottom plate 14 and right and left side plates or "fenders" 16 and 18.

The widths of flat top plate 12 and curved bottom plate 14 are substantially identical. The leading end of curved bottom plate 14 curves upwardly adjacent the leading end of flat top plate 12 to abut and be attached to the leading end of flat top plate 12, as best seen in FIG. 1. That portion of curved bottom plate 14 rearwardly of the lowest reach "R" of the curved leading end is substantially flat. The lowest reach "R" of curved bottom plate 14 occurs at the junction of the curved and flat portions thereof. The trailing ends of flat top plate 12 and the flat portion of curved bottom plate 14 abut and are attached to each other, as best seen in FIG. 1. The angle "a" between plane of flat top plate 12 and the plane of the flat portion of curved bottom plate 14 is about 8 degrees.

Right and left side plates 16 and 18 are attached to the right and left side edges of flat top plate 12 and curved bottom plate 14, respectively. Right and left side plates 16 and 18 are preferably rectangular in shape. The length and height of right and left side plates 16 and 18 are substantially identical, and the upper longitudinal edge of each extends above the upper surface of flat top plate 12 a substantially equal distance. The bottom longitudinal edges of right and left side plates 16 and 18 are closely adjacent the lowest reach "R" of the curved portion of curved bottom plate 14.

Right and left side plates 16 and 18 completely enclose the space formed between flat top plate 12 and curved bottom plate 14, thereby forming a watertight compartment which acts as a flotation chamber. The major portion of the flotation chamber thus formed is located in about the forward 40 percent of the fishing device 10 in order to support the keel weight 26 and attachment tackle. Fishing device 10 is designed to float at rest (when not moving as during trolling) and therefore has virtually no drag on fighting fish.

Although it is preferred to have bottom plate 14 formed of a single piece and curved as shown for hydrodynamic reasons, bottom plate 14 could be bent at a sharp angle at its lowest reach "R", or formed by two separate plates joined at "R". Whenever the phrase "curved bottom plate" is used herein it is intended to include all three such configurations.

Right and left side plates or fenders 16 and 18 perform five functions. They help provide stability to prevent fishtailing in the diving mode. They help prevent porpoising in the planer mode. They help restrict water from flowing over the side from the top of the device thereby adding to the diving force of the device. They restrict water from entering about the aft 60 percent bottom sides where turbulence has been created by the hump created by the major area of the flotation chamber. They provide mounts for the planer mode arm 80, discussed below.

A keel member 20 is non-rotatably attached at its upper end to a pivot rod 22 which is rotatably held by pivot rod holder 24 located on the non-curved portion of curved bottom plate 14 adjacent its lowest reach "R". Pivot rod 22 is threaded at its outer end and a nut 25 can be loosened to allow pivot keel member 20 to be adjusted to and held in any position in the 180 degree arc beneath curved bottom plate 14, i.e., any position between substantial abutment with the bottom edge of right side plate 16 and substantial abutment with the bottom edge of left side plate 18. Spring member 23 surrounds the inner end of pivot rod 22, and, in extending between nut 25 and pivot rod holder 24, helps to hold pivot rod 22 in its selected position within pivot rod holder 24 when nut 25 is tightened thereagainst.

A torpedo-shaped keel weight 26 is attached to the lower end of keel member 20 at an angle extending upwardly towards the leading edge of fishing device 10. A fixed strut 28, whose leading edge is angled upwardly, extends forwardly from keel member 20 adjacent its upper edge.

A swivel attachment 30 is attached to the lower surface of curved bottom plate 14 and is adapted to receive a leader 32 which, in use, is attached to a fishing lure setup (not shown).

A support member 40 is secured to flat top plate 12 by any suitable attachment means. Support member 40 includes two spaced apart legs 42 and 42' which extend upwardly and terminate in jaws 44 and 44'.

Tackle attachment means 50 includes a hook member 52 which is mounted through the opening in eye member 54. A second eye 55 connects with swivel eye 56 with ball 58.

Fishing line receiving means is preferably a conventional swivel member 60 located between fishing line 62 and tackle attachment means 50.

Figure 4:
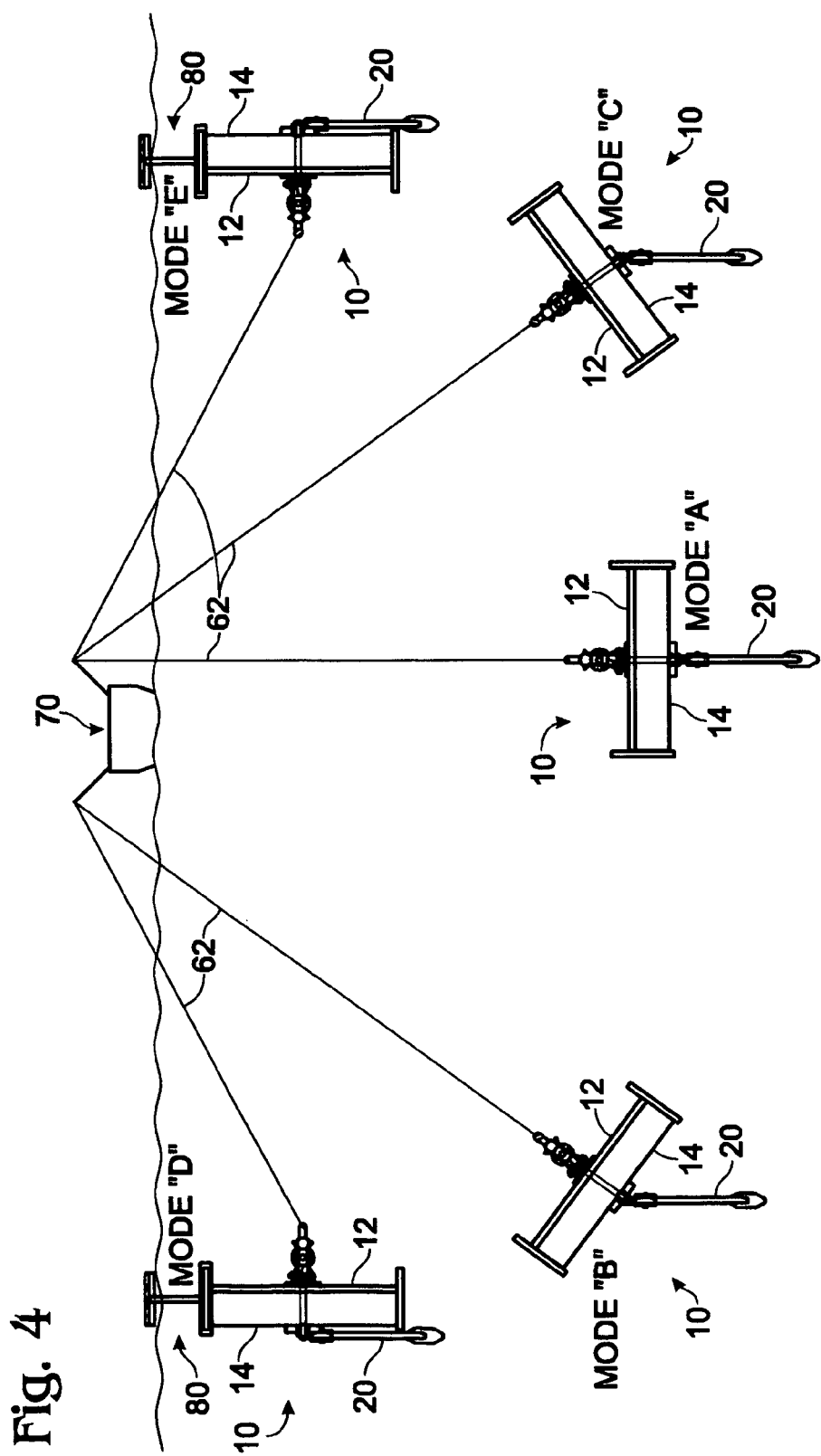
FIG. 4 are front views of the fishing device shown in various modes of operation.

Fishing device 10, as just described, is adapted in use to act in either a deep diver mode or in a right or left side diver mode. FIG. 4 illustrates five different modes of operation, modes "A", "B", "C", "D", and "E". Any mode in the 180 degree arc from port to starboard can be employed. In FIG. 4, the boat 70 is trolling towards the viewer.

Mode "A" illustrates fishing device 10 being used in its deep diver mode. For this mode of operation the keel 20 is positioned to be substantially perpendicular to the plane of the top flat plate 12.

Mode "B" illustrates fishing device 10 being used in a right side diver mode. For this mode of operation the keel 20 is positioned to be inclined towards left side plate 18 at an angle of about 45 degrees to the plane of the top flat plate 12.

Mode "C" illustrates fishing device 10 being used in a left side diver mode. For this mode of operation the keel 20 is positioned to be inclined towards right side plate 16 at an angle of about 45 degrees to the plane of the top flat plate 12.

There are essentially three forces which cause fishing device 10 to travel to a desired location in the water: the reactionary force of water flowing onto the flat top plate 12; the gravity force on the keel weight 26; and the tension on fishing line 62.

Figure 5:
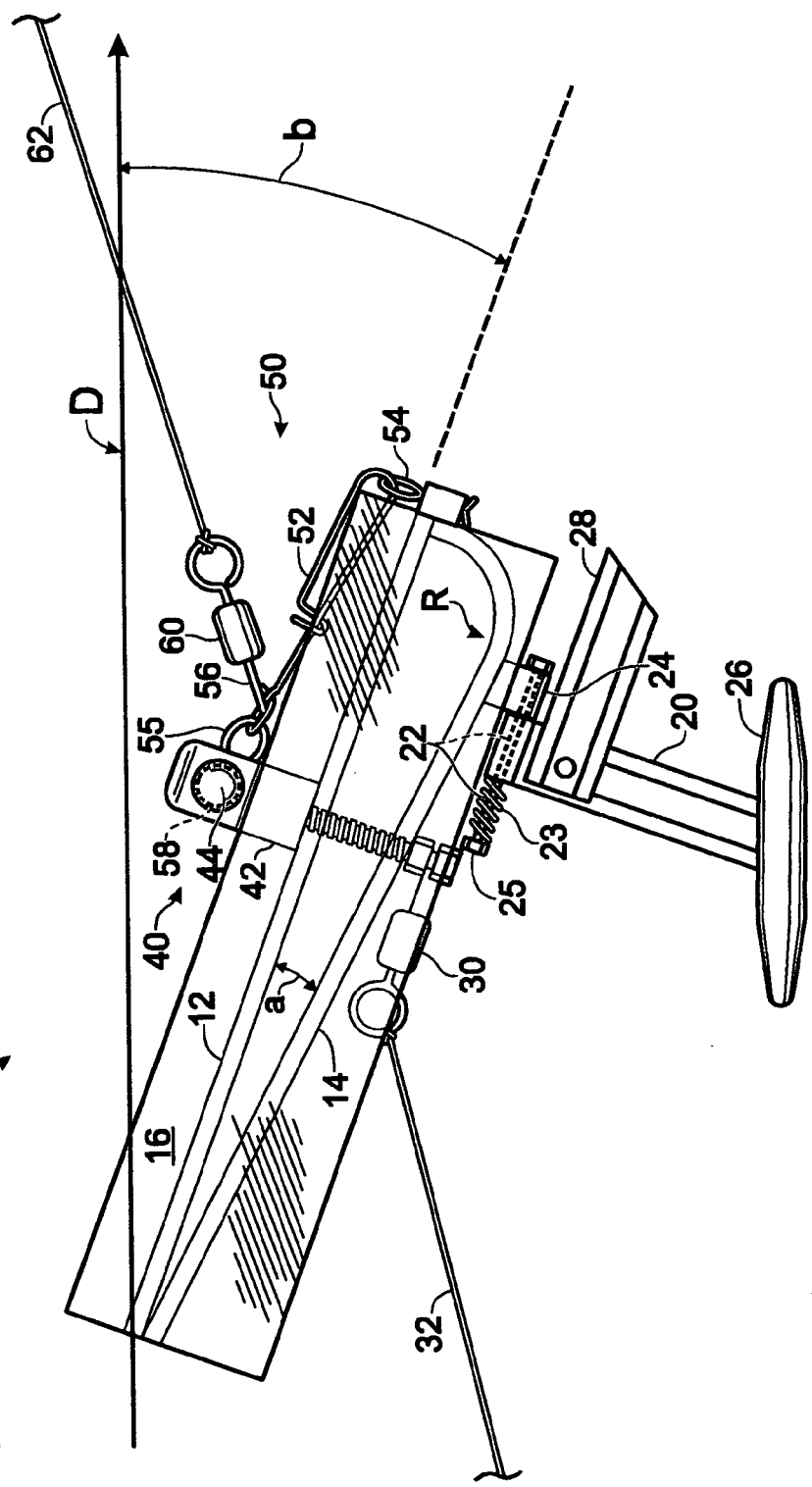
FIG. 5 is a right side view showing the attitude of the device during trolling.

Except when fishing device 10 is at rest, i.e., not moving through the water, and regardless of whether it is in a deep dive, side dive, or sub-surface planer mode, the angle "b" between the plane of top plate 12 and the direction of travel "D" is about 20 degrees. See FIG. 5. Angle "b" can be increased by moving the support member 40 rearwardly on top plate 12, thus increasing angle "b". Conversely, the angle "b" can be decreased by moving support member forwardly on top plate 12, thus decreasing the angle "b".

Figure 3B:
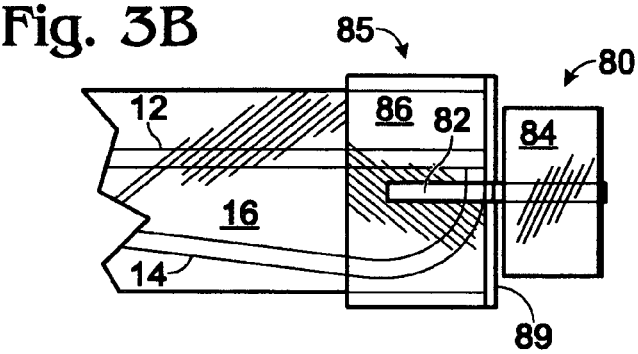
FIG. 3B is a top plan view of the planer ski attachment.
Figure 3C:
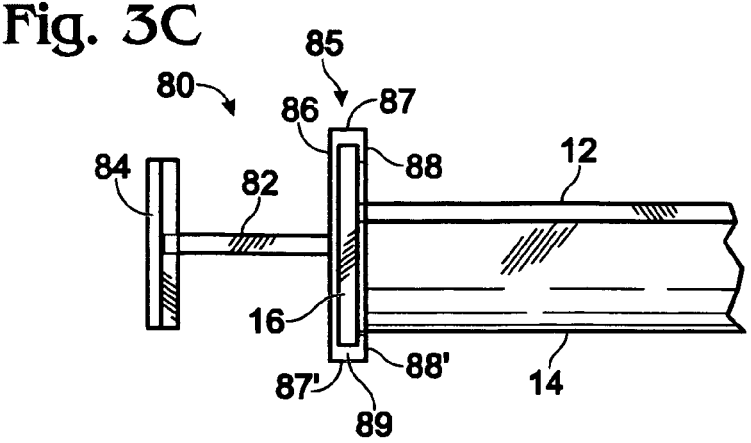
FIG. 3C is a front elevational view of the planer ski attachment.

Fishing device 10 can be easily modified to allow it to be used in a planer mode. This is accomplished by placing planer mode arm 80 onto right or left side plate 16 or 18 adjacent the leading edge thereof. FIGS. 3A, 3B, and 3C illustrate the planer mode arm 80 positioned onto right side plate 16. It would appear the same if placed onto left side plate 18.

Planer mode arm 80 includes a strut 82 having a planer ski 84 attached to its upper end and an attachment plate 85 attached to its lower end.

The plane of strut 82 is parallel to the plane of flat top plate 12.

Planer ski 84 is inclined at an upwardly facing angle of about 20 degrees to the plane of top member 86 of attachment plate 85.

Attachment plate 85 includes a generally rectangular top member 86, side walls 87 and 87' extending downwardly from said top member 86, opposing lips 88 and 88' extending inwardly toward each other from the bottom edges of side walls 87 and 87', respectively, and a stop member 89 extending between the leading edges of side walls 87 and 87'.

Planer mode arm 80 is positioned onto right side plate 16 by sliding it into the slots formed by top member 86, side walls 87, 87' and lips 88, 88' until stop member 89 abuts the leading ends of right side plate 16.

With planer mode arm 80 positioned onto right side plate 16, as shown in FIGS. 3A, 3B, and 3C, fishing device 10 is adapted in use to act in a right planer mode, shown as mode "D" in FIG. 4, keel 20 being positioned to abut the lower edge of left side plate 18.

Reversing this configuration by placing planer attachment member 80 onto left side plate 18 adapts fishing device 10 to be used in a left planer mode, shown as mode "E" in FIG. 4. In this mode, keel 20 is positioned to abut the lower edge of right side plate 16.

Planer mode arm 80 helps to stop porpoising in the planer mode of operation. The plane of strut 82 being parallel to the plane of flat top plate 12, water flows onto strut 82 at an angle of about 20 degrees. Consequently, the entire fishing device 10 begins to roll into a deeper dive position but is held back by the planer ski 84 which just skims the water, causing the fishing device to travel horizontally just below the surface.

In operation, the user decides in which mode of operation fishing device 10 is to be used. Depending on the mode selected (i.e., modes A, B, C, D, or E, or any mode on the 180 degree arc port to starboard through which keel 20 can be positioned) nut 25 is loosened to allow keel 20 and attached pivot rod 22 to be moved to the selected mode position. Nut 25 is then tightened to secure the selected mode position. If the mode position selected is the right or left planar mode (i.e., modes D or E), planer arm 80 is attached to either the right or left side plate 16 or 18, as shown. If the mode position selected is a diver mode, planer arm 80 is not employed.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A fishing device comprising:
   a top plate, a curved bottom plate, said top and bottom plates having leading and trailing ends and right and left sides, said top and bottom plates being joined at their leading and trailing ends;
   right and left side plates attached to the right and left sides of said top and bottom plates to thereby form a watertight compartment adapted to provide flotation ability to said device when said device is not being trolled, said right and left side plates having leading and trailing ends and top and bottom edges;
   a keel member mounted on said curved bottom plate in a manner adapted to allow said keel member to be adjusted and held at any position throughout an arc of substantially 180 degrees between substantial abutment with the bottom edge of said right side plate and substantial abutment with the bottom edge of said left side plate;
   a keel weight attached to said keel member; and
   a support member for attaching said fishing device to a fishing line and means for attaching said fishing device to a fishing lure.

2. The fishing device of claim 1 wherein said curved bottom plate has a curved portion adjacent its leading end and a substantially flat portion extending from said curved portion to said trailing end.

3. The fishing device of claim 2 wherein said keel member has an upper edge attached to a pivot rod, said pivot rod being releasably locked within a pivot rod holder attached to the bottom of said curved bottom plate.

4. The fishing device of claim 3 wherein said pivot rod holder is attached to the bottom of said curved bottom plate at a location adjacent the juncture of said flat portion and said curved portion thereof.

5. The fishing device of claim 1 wherein the planes of said top plate and the substantially flat portion of said bottom plate are at an angle of about 8 degrees to each other.

6. The fishing device of claim 1 wherein said side plates are substantially rectangular in shape and substantially the same size.

7. The fishing device of claim 1 wherein said support member for attaching said fishing device to a fishing line is attached to said top plate at a location adapted to provide an angle between the plane of said top plate and the direction of travel of about 20 degrees when said device is moving through the water.

8. The fishing device of claim 1 including a planer mode arm releasably attached to either said right side plate or said left side plate adjacent its leading end, said planer mode arm including an attachment plate for releasably attaching said planer mode arm to said side plate, a strut extending upwardly from said attachment plate, and a planer ski attached to the upper end of said strut.

9. The fishing device of claim 8 wherein said planer ski is inclined at an upwardly facing angle.

10. The fishing device of claim 9 wherein said upwardly facing angle is about 20 degrees.

11. The fishing device of claim 8 wherein said attachment plate includes slots adapted to receive the top and bottom edges of said side plate.

12. The fishing device of claim 11 wherein said attachment plate includes a stop member adapted to abut the leading ends of said side plate.

13. The fishing device of claim 1 including a fixed strut having a leading edge that is angled upwardly, said fixed strut extending forwardly from said keel member.

14. The fishing device of claim 13 wherein said keel member has an upper edge, and said fixed strut extends forwardly from said keel member adjacent said upper edge.

* * * * *